April 5, 1927.  A. MacKAY  1,623,425
DRIER HEATING SYSTEM
Filed Sept. 26, 1924
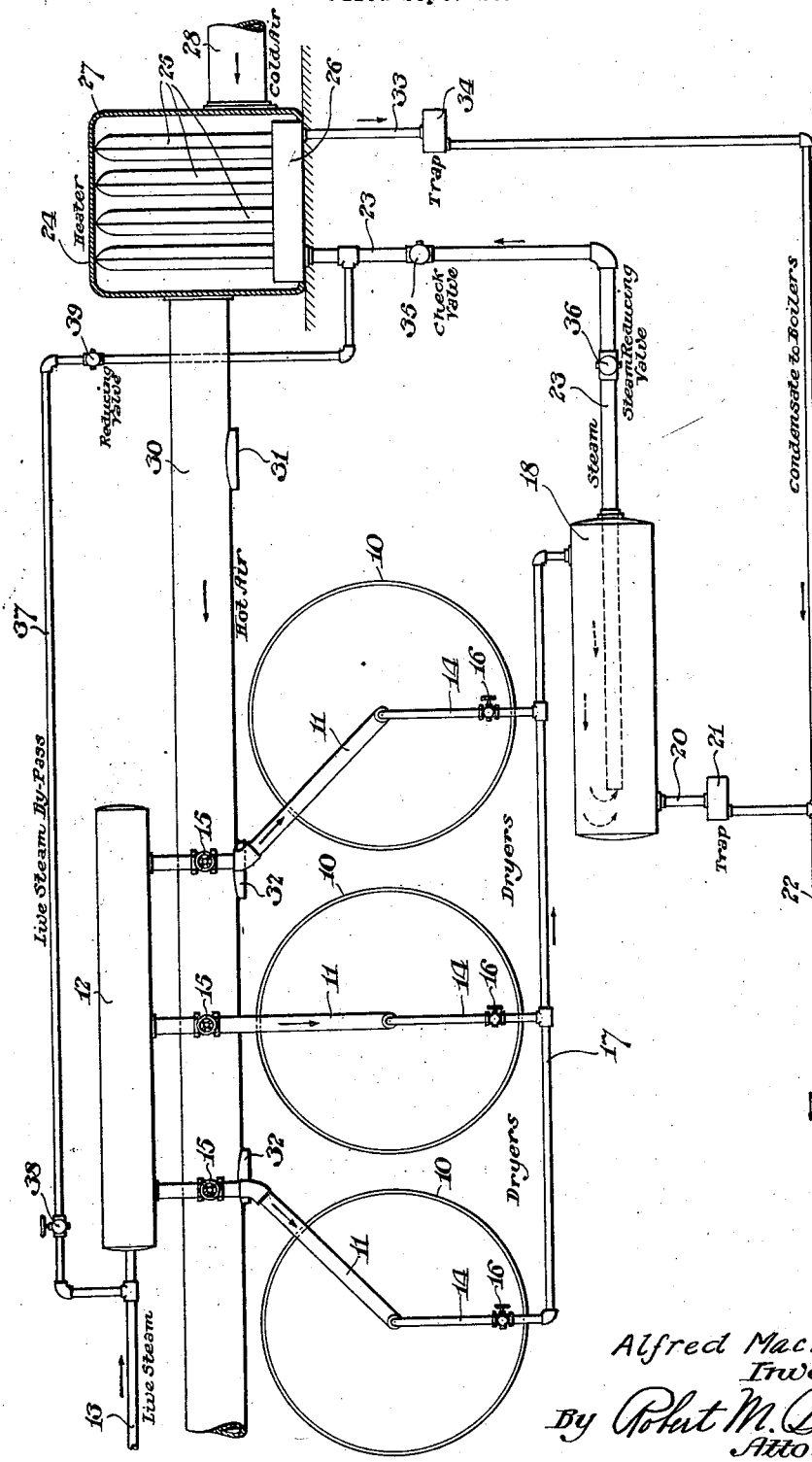
Alfred MacKay
Inventor
By Robert M. Barr
Attorney.

Patented Apr. 5, 1927.

1,623,425

UNITED STATES PATENT OFFICE.

ALFRED MacKAY, OF PHILADELPHIA, PENNSYLVANIA.

DRIER-HEATING SYSTEM.

Application filed September 26, 1924. Serial No. 740,061.

The present invention relates to the heating of drying machines for use in drying continuous lengths of material, and more particularly to the steam heated rotary driers used in the paper making industry.

Some of the objects of the present invention are to provide an improved heating system for driers; to provide a heating system wherein the loss of heat units is reduced to a minimum; to provide a heating system for use with rotating cylinders whereby the condensation of steam within the cylinders is materially reduced; to provide means for utilizing the heat units of a steam system for driers which are ordinarily wasted; to provide means for maintaining a relatively small difference of temperature between the inside and the outside of drier cylinders; to provide a system wherein the exhaust from the steam drying cylinders is utilized; to provide a means whereby the air and other gases passing in with the steam are removed from the drier; and to provide other improvements as will hereinafter appear.

In the accompanying drawings the figure represents diagrammatically a drier heating system embodying one form of the present invention.

Referring to the drawings, a plurality of drying cylinders 10 are illustrated as a part of a system for drying paper, cloth or other material which is fed around the heated periphery of the cylinders as the latter are rotated at a desirable speed, as well understood in the art. The cylinders 10 are heated by steam supplied by way of separate inlet pipes 11 from a common header 12 connected to a pipe 13 leading from a source of live steam. The inlet pipes 11 connect respectively to the cylinders 10 by way of the axis of rotation, for example, by any well known form of hollow bearings, while the exhaust from the cylinders 10 leaves in the same manner by discharge pipes 14 as will be understood. Suitable valves 15 are located respectively in the inlet pipes 11 for control purposes, and like valves 16 are located in the discharge pipes 14 for a like purpose.

For the purpose of providing for a continuous flow of steam through the driers or cylinders 10, the discharge pipes 14 are all connected to a conduit 17 leading to and in communication with the top of a steam separator 18. The steam, air and water of condensation entering this separator 18 are subjected to the usual separating action so that the water leaves by way of drain pipe 20 leading to a trap 21 which functions periodically and automatically to empty the collected water into the return 22 leading to the boiler or a hot well as the case may be. The separated steam and air are free to leave the separator 18 by way of a pipe 23 which has one end in communication with the steam space of the separator 18 while its other end leads to a point of use, as will be explained.

In order to reduce condensation in the driers 10 and also to utilize approximately all of the available heat units of the steam, a heater 24 is provided, here shown, by way of example, as formed of hollow sections 25 communicating with a header 26 which receives the steam from the pipe 23. The heater 24 is arranged within a housing 27 having an inlet duct 28 communicating with cold air supplied by a fan blower or equivalent means and an outlet duct 30 at the opposite side arranged to discharge the air by a fan blower or equivalent means in its heated condition into the drier room by way of an outlet 31 and by way of outlets 32 directly upon the drying cylinders 10. The header 26 is provided with a drain pipe 33 leading to a trap 34 which is arranged to periodically discharge into the return 22 leading to the boiler. A check valve 35 is preferably located in the steam pipe 23, and under some conditions it may be advisable to also include a reducing valve 36 in the same pipe 23.

In some instances the supply of separated steam to the heater 24 may be supplemented by live steam direct from the original source and to that end a by-pass pipe 37 is connected between the supply pipe 13 and the pipe 23 leading to the heater 24. A valve 38 is located in the pipe 37 for control purposes, and if necessary a reducing valve 39 may also be placed in this pipe 37.

In the operation of the system the drier cylinders 10 are rotated in the usual manner and the material to be dried is fed about the peripheries of the cylinder in contact with the surfaces heated by the steam supplied to the interior of the cylinders. The steam enters by the pipes 11 and discharges by way of the pipes 14 into the separator 18 where the water of condensation drains into the trap 21 while the steam passes by way of the pipe 22 to and through the heater sections 25. The sections 25 absorb the residual heat units in the steam and transfer them by radiation to the incoming cool air which is passing over the outer surface of the heater sections. The air is thus heated and leaves by way of the conduit 30 to be distributed from the outlets 31 and 32 into the drying room and also in such close proximity to the driers, as will effectually raise the temperature surrounding the drier cylinders and thus reduce the condensation of steam within such cylinders. The water of condensation from the heater 24 is conducted by the pipe 33 to the trap 34 and then periodically returned to the boiler or hot well.

When it becomes necessary to increase the temperature surrounding the cylinders, live steam can be delivered directly to the heater 24 by utilizing the by-pass pipe 37 through opening of the valve 38.

It will now be apparent that a complete unitary drying system has been devised wherein the drying cylinders are prevented from becoming air bound, and any air or gas carried into a cylinder by the steam is carried by that medium through the separator and to the heating coils. Thus, in each drying cylinder the steam and air, as well as any gas content, are blown directly and separately through the cylinders, and all of the available heat units in the steam are utilized and there is no loss by being carried off in the exhaust.

While only a single form is shown in which this invention may be embodied, it is to be understood that the invention is not limited to any specific construction, but might be applied to various forms without departing from the spirit of the invention or the scope of the appended claims.

Having thus described my invention I claim:

1. In a drier system, the combination of a plurality of drying cylinders, means to separately introduce live steam to said cylinders, a steam separator common to said cylinders and connected to receive exhaust steam therefrom, heater sections in communication with said separator to receive steam therefrom, a housing for said sections having an inlet for cold air and an outlet for heated air, and means for discharging the air from said outlet about the exterior of said cylinders.

2. In a drier system, the combination of a plurality of drying cylinders, means to separately introduce live steam to said cylinders, a steam separator common to said cylinders and connected to receive exhaust steam therefrom, heater sections in communication with said separator to receive steam therefrom, a housing for said sections having an inlet for cold air and an outlet for heated air, means for discharging the air from said outlet about the exterior of said cylinders, and means to introduce live steam to said heater sections at will.

3. In a drier system, the combination of a plurality of drying cylinders, means to separately introduce live steam to said cylinders, a heater unit, means to conduct exhaust steam from said cylinders to said heater unit, a housing for said heater unit having an inlet for cold air and an outlet for heated air, and means for discharging the air from said outlet about the exterior of said cylinders.

Signed at Philadelphia, in the county of Philadelphia, and State of Pennsylvania, this 11 day of Sept., 1924.

ALFRED MacKAY.